(12) United States Patent
Chen et al.

(10) Patent No.: US 9,612,489 B2
(45) Date of Patent: Apr. 4, 2017

(54) PLACEMENT AND SHAPE OF ELECTRODES FOR USE IN DISPLAYS

(75) Inventors: Cheng Chen, Cupertino, CA (US); Shih Chang Chang, Cupertino, CA (US); Ming Xu, Cupertino, CA (US); Shawn Robert Gettemy, San Jose, CA (US); Mingxia Gu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 1672 days.

(21) Appl. No.: 12/371,364

(22) Filed: Feb. 13, 2009

(65) Prior Publication Data

US 2010/0207854 A1    Aug. 19, 2010

(51) Int. Cl.
| | | |
|---|---|---|
| *G09G 3/36* | (2006.01) | |
| *G02F 1/1343* | (2006.01) | |
| *G02F 1/1335* | (2006.01) | |
| *G02F 1/139* | (2006.01) | |

(52) U.S. Cl.
CPC ...... *G02F 1/134363* (2013.01); *G02F 1/1393* (2013.01); *G02F 1/133512* (2013.01); *G02F 2001/134372* (2013.01); *G02F 2001/134381* (2013.01); *G02F 2201/122* (2013.01)

(58) Field of Classification Search
CPC ... G09G 2300/0421; G09G 2300/0426; G09G 2300/04; G02F 1/134363; G02F 1/133512; G02F 1/1393
USPC ........ 345/78; 257/448; 349/141, 94, 52, 122
See application file for complete search history.

(56) References Cited

U.S. PATENT DOCUMENTS

| | | | |
|---|---|---|---|
| 4,991,115 A | 2/1991 | Guthrie et al. | |
| 5,396,351 A | 3/1995 | Gessel | |
| 5,450,222 A | 9/1995 | Sirkin | |
| 5,659,378 A | 8/1997 | Gessel | |
| 6,072,554 A * | 6/2000 | Sato | G02F 1/134363 349/138 |
| 6,157,426 A | 12/2000 | Gu | |
| 6,285,431 B2 | 9/2001 | Lyu | |
| 6,433,933 B1 | 8/2002 | Gettemy | |
| 6,466,285 B1 | 10/2002 | Ichikawa | |
| 6,466,290 B2 * | 10/2002 | Kim et al. | 349/141 |
| 6,536,933 B1 | 3/2003 | Gettemy et al. | |
| 6,545,862 B1 | 4/2003 | Gettemy et al. | |

(Continued)

FOREIGN PATENT DOCUMENTS

| | | |
|---|---|---|
| JP | 2001092382 | 4/2001 |
| KR | 2004061426 | 7/2004 |
| WO | 2008077261 | 7/2008 |

OTHER PUBLICATIONS

Jung, Byunghoo, et al.; "Improved aperture Ration Through Assymetric Pixel Electrode Design"; Feb. 13, 1997.

(Continued)

*Primary Examiner* — Srilakshmi K Kumar
*Assistant Examiner* — Ifedayo Iluyomade
(74) *Attorney, Agent, or Firm* — Fletcher Yoder PC

(57) ABSTRACT

A liquid crystal display (LCD) is provided having a discontinuous electrode. In certain embodiments, different portions (such as finger- or slit-like extensions) of the discontinuous electrode may be at different depths relative to one another and/or may be of different widths relative to one another. Similarly, in other embodiments, the different portions of the discontinuous electrode may be spaced apart in a non-uniform manner.

23 Claims, 8 Drawing Sheets

(56) References Cited

U.S. PATENT DOCUMENTS

| | | |
|---|---|---|
| 6,603,469 B1 | 8/2003 | Gettemy et al. |
| 6,618,044 B1 | 9/2003 | Gettemy et al. |
| 6,642,985 B2 | 11/2003 | Kim |
| 6,685,328 B1 | 2/2004 | Hanson et al. |
| 6,700,560 B2 | 3/2004 | Sumiya |
| 6,710,754 B2 | 3/2004 | Oliver et al. |
| 6,718,115 B1 | 4/2004 | Gettemy et al. |
| 6,741,314 B2 | 5/2004 | Song |
| 6,859,244 B2 | 2/2005 | Kawase et al. |
| 6,888,532 B2 | 5/2005 | Wong et al. |
| 6,919,681 B2 | 7/2005 | Cok |
| 6,924,752 B2 | 8/2005 | Gettemy et al. |
| 6,924,863 B2 | 8/2005 | Nishida |
| 6,947,017 B1 | 9/2005 | Gettemy |
| 6,965,375 B1 | 11/2005 | Gettemy et al. |
| 6,992,659 B2 | 1/2006 | Gettemy |
| 7,002,569 B1 | 2/2006 | Gettemy et al. |
| 7,006,080 B2 | 2/2006 | Gettemy |
| 7,034,802 B1 | 4/2006 | Gettemy et al. |
| 7,048,401 B2 | 5/2006 | Lee et al. |
| 7,057,579 B2 | 6/2006 | Hanson et al. |
| 7,057,698 B2 | 6/2006 | Chung |
| 7,068,256 B1 | 6/2006 | Gettemy et al. |
| 7,079,119 B2 | 7/2006 | Hanson et al. |
| 7,091,964 B2 | 8/2006 | Wong et al. |
| 7,095,387 B2 | 8/2006 | Lee et al. |
| 7,159,194 B2 | 1/2007 | Wong et al. |
| 7,167,309 B2 | 1/2007 | Saxena |
| 7,203,075 B2 | 4/2007 | Terada |
| 7,248,271 B2 | 7/2007 | Credelle |
| 7,248,320 B2 | 7/2007 | Hirakata |
| 7,256,767 B2 | 8/2007 | Wong et al. |
| 7,268,775 B1 | 9/2007 | Gettemy |
| 7,304,707 B2 | 12/2007 | Son |
| 7,324,093 B1 | 1/2008 | Gettemy et al. |
| 7,339,639 B2 | 3/2008 | Nakano et al. |
| 7,342,571 B2 | 3/2008 | Fraser et al. |
| 7,348,964 B1 | 3/2008 | Gettemy et al. |
| 7,349,052 B2 | 3/2008 | Wu et al. |
| 7,362,338 B1 | 4/2008 | Gettemy et al. |
| 7,379,143 B2 | 5/2008 | Lyu |
| 7,425,970 B1 | 9/2008 | Gettemy et al. |
| 7,466,373 B2 | 12/2008 | Xu et al. |
| 7,483,016 B1 | 1/2009 | Gettemy et al. |
| 7,522,245 B2 * | 4/2009 | Kim et al. .................. 349/141 |
| 2003/0098857 A1 | 5/2003 | Gettemy et al. |
| 2003/0160755 A1 | 8/2003 | Gettemy et al. |
| 2004/0046739 A1 | 3/2004 | Gettemy |
| 2004/0085503 A1 | 5/2004 | Kim |
| 2004/0109122 A1 * | 6/2004 | Kumagawa et al. ......... 349/143 |
| 2005/0139837 A1 | 6/2005 | Lee |
| 2005/0184939 A1 * | 8/2005 | Ueda et al. .................... 345/87 |
| 2005/0184974 A1 | 8/2005 | Gettemy et al. |
| 2005/0212999 A1 | 9/2005 | Yang |
| 2005/0269580 A1 | 12/2005 | D'Angelo |
| 2006/0018175 A1 | 1/2006 | Liljedahl |
| 2006/0066805 A1 | 3/2006 | Grunnet-Jepsen |
| 2006/0197740 A1 | 9/2006 | Xu et al. |
| 2006/0203169 A1 | 9/2006 | Ozawa |
| 2006/0232553 A1 | 10/2006 | Wong et al. |
| 2006/0256264 A1 | 11/2006 | Yang |
| 2006/0268560 A1 | 11/2006 | Wong et al. |
| 2006/0279557 A1 | 12/2006 | Gettemy |
| 2006/0284178 A1 * | 12/2006 | Konno ............................ 257/59 |
| 2006/0284895 A1 | 12/2006 | Marcu et al. |
| 2007/0024583 A1 | 2/2007 | Gettemy et al. |
| 2007/0052617 A1 | 3/2007 | Hanson et al. |
| 2007/0069975 A1 | 3/2007 | Gettemy et al. |
| 2007/0070272 A1 | 3/2007 | Gettemy et al. |
| 2007/0070282 A1 | 3/2007 | Shibahara |
| 2007/0115417 A1 | 5/2007 | Ge et al. |
| 2007/0139586 A1 | 6/2007 | Gu et al. |
| 2007/0152963 A1 | 7/2007 | Wong et al. |
| 2007/0222927 A1 | 9/2007 | Uehara |
| 2007/0229475 A1 | 10/2007 | Gettemy et al. |
| 2007/0229749 A1 | 10/2007 | Kaneko |
| 2007/0235635 A1 * | 10/2007 | Arend et al. ................ 250/214.1 |
| 2007/0273714 A1 | 11/2007 | Hodge et al. |
| 2007/0290989 A1 | 12/2007 | Gettemy et al. |
| 2007/0296693 A1 | 12/2007 | Wong et al. |
| 2008/0032755 A1 | 2/2008 | Fraser et al. |
| 2008/0036948 A1 | 2/2008 | Zhong et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0068549 A1 | 3/2008 | Liao |
| 2008/0074400 A1 | 3/2008 | Gettemy et al. |
| 2008/0083569 A1 | 4/2008 | Gettemy et al. |
| 2008/0117184 A1 | 5/2008 | Gettemy |
| 2008/0121898 A1 | 5/2008 | Yin et al. |
| 2008/0137018 A1 | 6/2008 | Lin |
| 2008/0143946 A1 | 6/2008 | Wang |
| 2008/0164056 A1 | 7/2008 | Gettemy et al. |
| 2008/0180801 A1 | 7/2008 | Kobayashi |
| 2008/0186440 A1 | 8/2008 | Lim |
| 2008/0204431 A1 | 8/2008 | Chung et al. |
| 2008/0225217 A1 | 9/2008 | Wakabayashi |
| 2008/0231959 A1 | 9/2008 | Grip |
| 2008/0238813 A1 | 10/2008 | Gettemy et al. |
| 2008/0246726 A1 | 10/2008 | Gettemy |
| 2008/0259254 A1 | 10/2008 | Kikuchi |
| 2008/0303998 A1 | 12/2008 | Ohta |
| 2008/0309627 A1 | 12/2008 | Hotelling et al. |
| 2008/0309633 A1 | 12/2008 | Hotelling et al. |
| 2009/0009442 A1 | 1/2009 | Galbraith, Jr. et al. |
| 2010/0245749 A1 * | 9/2010 | Kimura ............. G02F 1/133555 349/143 |

OTHER PUBLICATIONS

U.S. Appl. No. 12/371,284, filed Feb. 13, 2009, Chang et al.
U.S. Appl. No. 12/371,316, filed Feb. 13, 2009, Chang et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,409, filed Feb. 13, 2009, Chen et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.

* cited by examiner

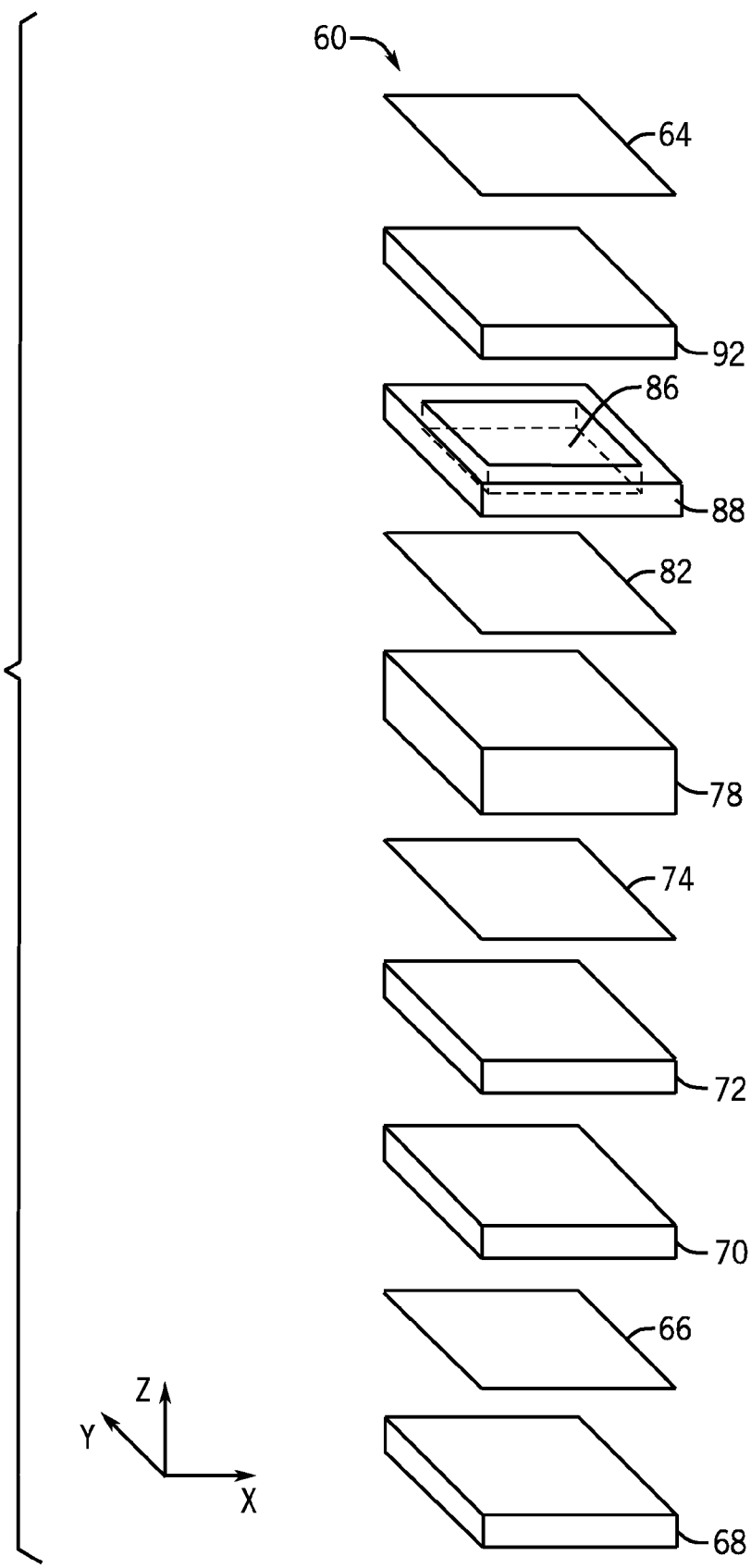

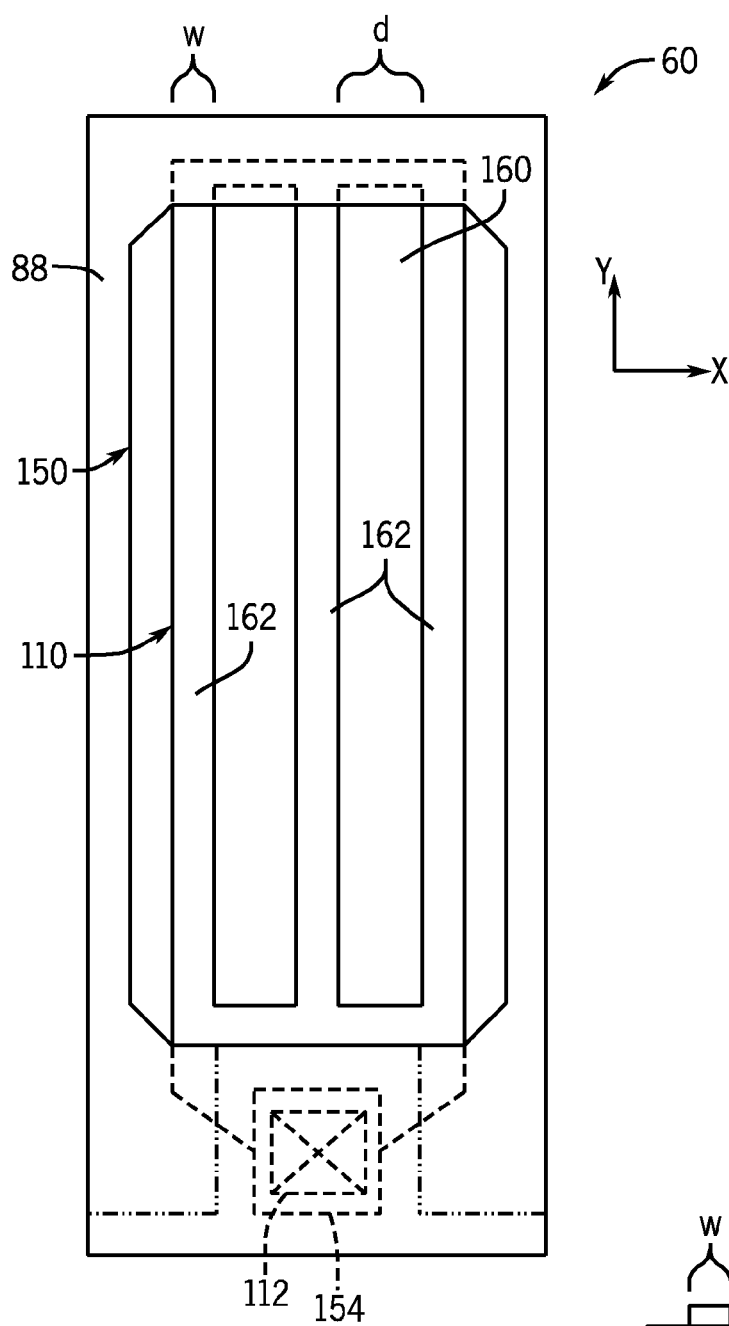
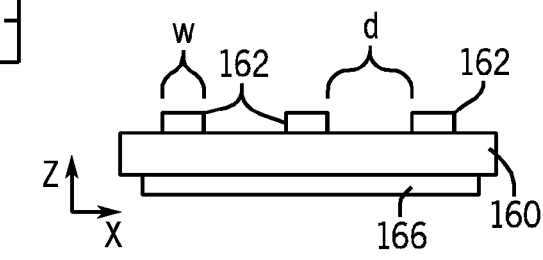
FIG. 7
PRIOR ART
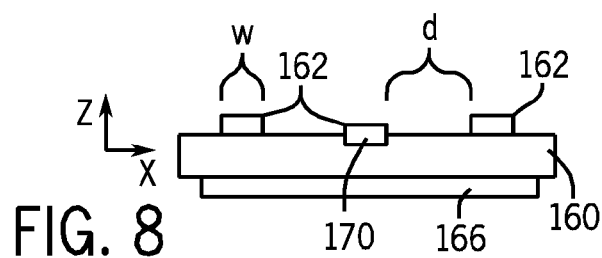

PLACEMENT AND SHAPE OF ELECTRODES FOR USE IN DISPLAYS

BACKGROUND

1. Technical Field

Embodiments of the present disclosure relate generally to electrodes used in displays, such as liquid crystal displays.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

The performance of an LCD may be measured with respect to a variety of factors. For example, the brightness of the display, the visibility of the display when viewed at an angle, the refresh rate of the display, and various other factors may all describe an LCD and/or determine whether a display will be useful in the context of a given device. For example, with respect to brightness, factors which may affect the brightness of a display include the area available to transmit light at each picture element (i.e., pixel) of the display. Likewise, another factor that may influence the brightness of an LCD may be the manner in which the liquid crystals forming the display are modulated. In particular, such modulation of the liquid crystals determines the amount of light transmitted by a pixel at a given time and artifacts, discontinuities, or irregularities in the fields affecting the liquid crystals may affect the perceived brightness of a pixel.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present disclosure relates to increasing the light transmission of LCD pixels. In accordance with the present disclosure, portions of an electrode of a pixel may be formed or otherwise provided in a non-uniform manner. For example, a pixel electrode may include two or more extensions (e.g. fingers or slits) that span a portion of the pixel in one direction. In one embodiment, different extensions of the pixel electrode may be formed at different depths relative to an underlying layer. In another embodiment, different extensions of the pixel electrode may be formed having different widths and/or different intervening spacing such that some extensions are wider than others and/or are spaced apart by different amounts.

In such embodiments, the differential spacing, width, and/or depth of portions of the electrode (e.g., the extensions of the pixel electrode in these examples) may shape an electric field generated using the electrode such that a more uniform alignment response may be elicited in a layer of liquid crystals. In particular, such uniformity in the alignment of the layer of liquid crystals may allow better control of the amount of light passing through the pixel. Further, use of such differential spacing, width, and/or depth of portions of the electrode may allow the use of a lower driving voltage than might otherwise be used to achieve the desired degree of light transmission in the liquid crystal layer.

BRIEF DESCRIPTION OF THE DRAWINGS

Advantages of the present disclosure may become apparent upon reading the following detailed description and upon reference to the drawings in which:

FIG. 4 is an exploded view of exemplary layers of a pixel of an LCD panel, in accordance with aspects of the present disclosure;

FIG. 6 is a plan view of an LCD pixel in accordance with aspects of the present disclosure;

FIG. 7 is one possible partial cross section of the LCD pixel of FIG. 6, in accordance with aspects of the prior art;

FIG. 8 is another possible partial cross section of the LCD pixel of FIG. 6, in accordance aspects of the present disclosure;

DETAILED DESCRIPTION OF SPECIFIC EMBODIMENTS

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to increasing light transmittance in LCD pixels. In certain embodiments, the increase in light transmittance may be accomplished by providing an electric field at the pixel which has suitable magnitudes at different points in a liquid crystal layer to achieve the desired degree of alignment of the liquid crystals at each respective point. That is, the magnitude of the electric field applied to the liquid crystal layer may be varied or adapted such that at different points in the liquid crystal layer experience the appropriate field strength (i.e., magnitude) to achieve uniform liquid crystal alignment. For example, liquid crystal near the edge of the pixel may not need the same field magnitude as liquid crystals in the center of the pixel to achieve the same alignment. In addition, a lower driving voltage may be employed in some instances to achieve the specified degree of light transmission.

In one embodiment, an electrode of the pixel may be configured or adapted to generate an electric field that yields a generally uniform liquid crystal response in a proximate liquid crystal layer. For example, a pixel may have portions or extensions at different depths relative to one another, of different widths relative to one another, and/or having different interval spacing relative to one another. Thus, one or more of these factors (e.g., depth, width, spacing) or other factors may be varied in the layout of the pixel to achieve the desired electric field characteristics in the liquid crystal layer. Obtaining the desired electric field in the liquid crystal layer may, in turn, provide better uniformity in the liquid crystal response and better resulting light transmittance by the pixel.

Figure 1:
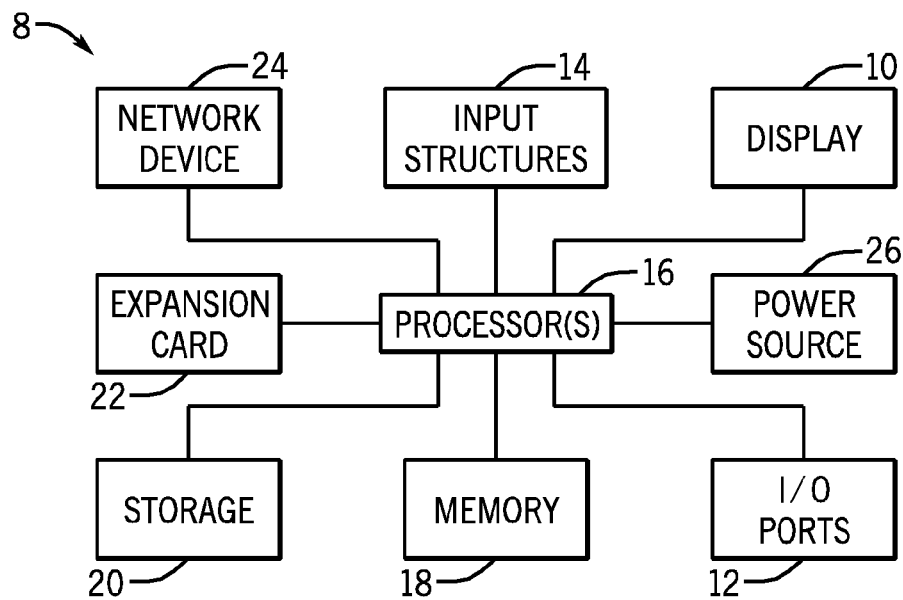
FIG. 1 is a block diagram of exemplary components of an electronic device, in accordance with aspects of the present disclosure.
Figure 3:
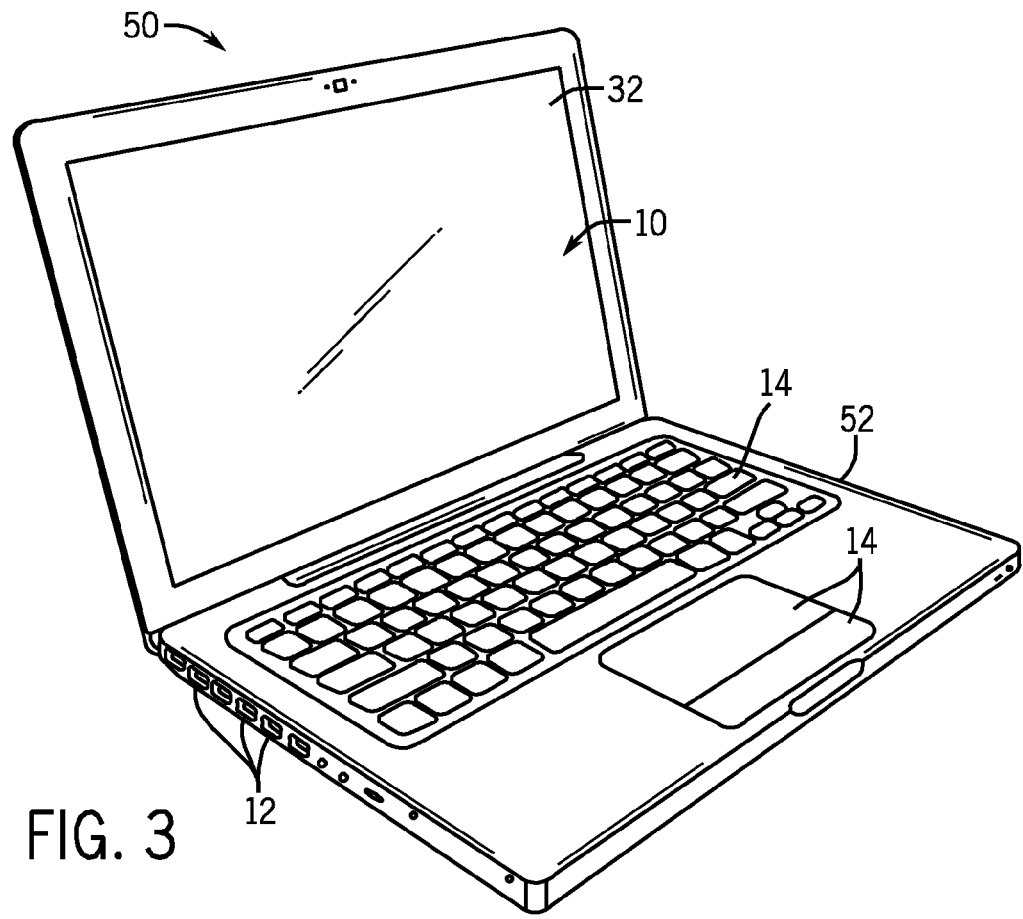
FIG. 3 is a view of a computer in accordance with aspects of the present disclosure.
Figure 2:
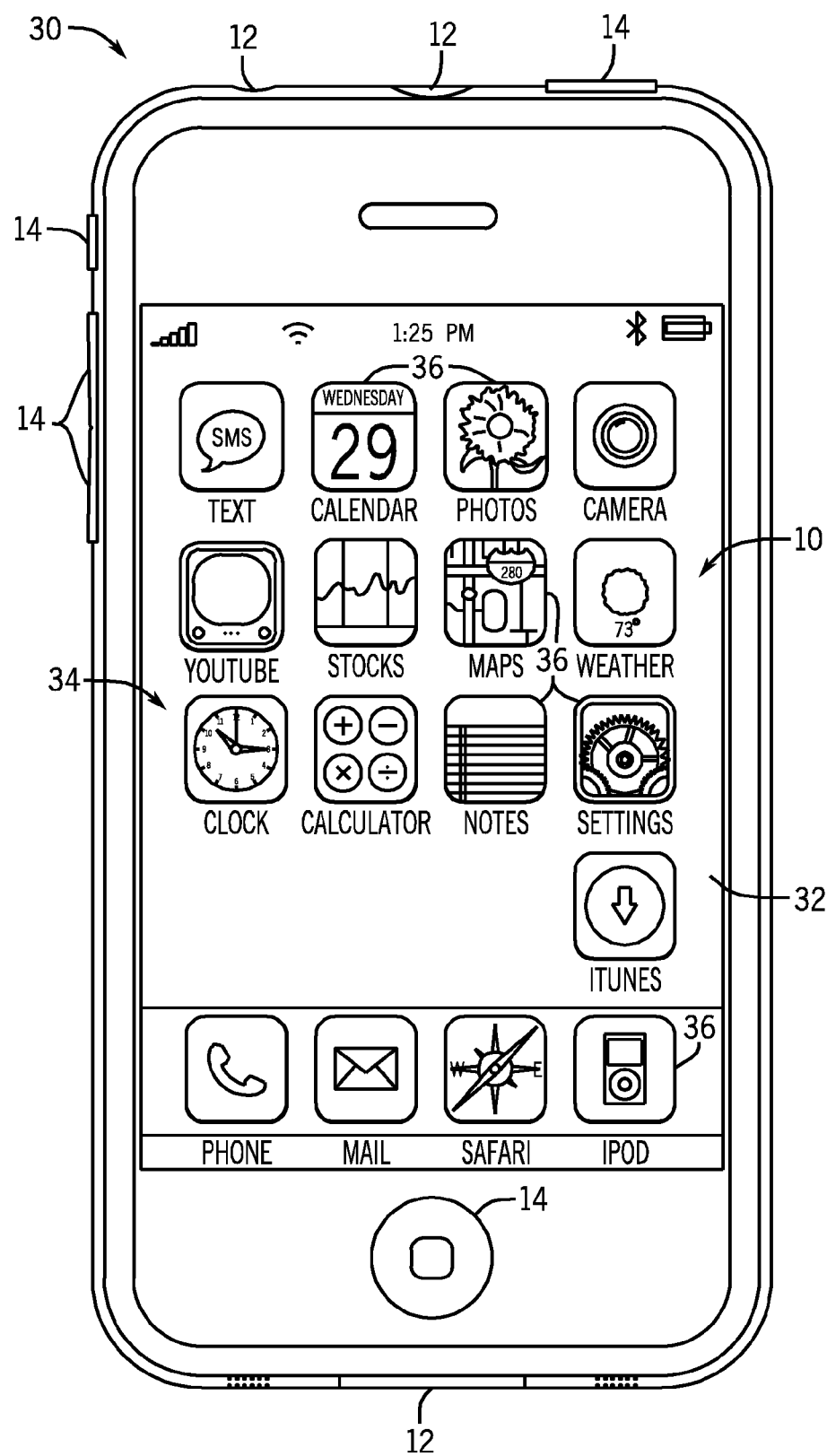
FIG. 2 is a front view of a handheld electronic device in accordance with aspects of the present disclosure.

With these foregoing features in mind, a general description of suitable electronic devices using LCD displays having such increased light transmittance is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with touch-sensitive element, such as a touch screen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an electrical field that is generally in-plane to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

With the foregoing in mind, and turning once again to the figures, FIG. 4 depicts an exploded view of different layers of a pixel of an LCD 32. The pixel 60 includes an upper polarizing layer 64 and a lower polarizing layer 66 that polarize light emitted by a backlight assembly 68 or light-reflective surface. A lower substrate 70 is disposed above the polarizing layer 66 and is generally formed from a light-transparent material, such as glass, quartz, and/or plastic.

A thin film transistor (TFT) layer 72 is depicted as being disposed above the lower substrate 70. For simplicity, the TFT layer 72 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 72 may include the respective data lines, scanning or gate lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 72 may include insulating layers (such as a gate insulating film) formed from suitable transparent materials (such as silicon oxide or silicon nitride) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 60, as described in further detail with regard to FIG. 5. An alignment layer 74 (formed from polyimide or other suitable materials) may be provided between the TFT layer 72 and an overlying liquid crystal layer 78.

The liquid crystal layer 78 includes liquid crystal molecules in a fluid shape or suspended in a polymer matrix. The liquid crystal molecules may be oriented or aligned with respect to an electrical field generated by the TFT layer 72. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 72 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate may be formed from light-transmissive glass, quartz, and/or plastic.

Figure 5:
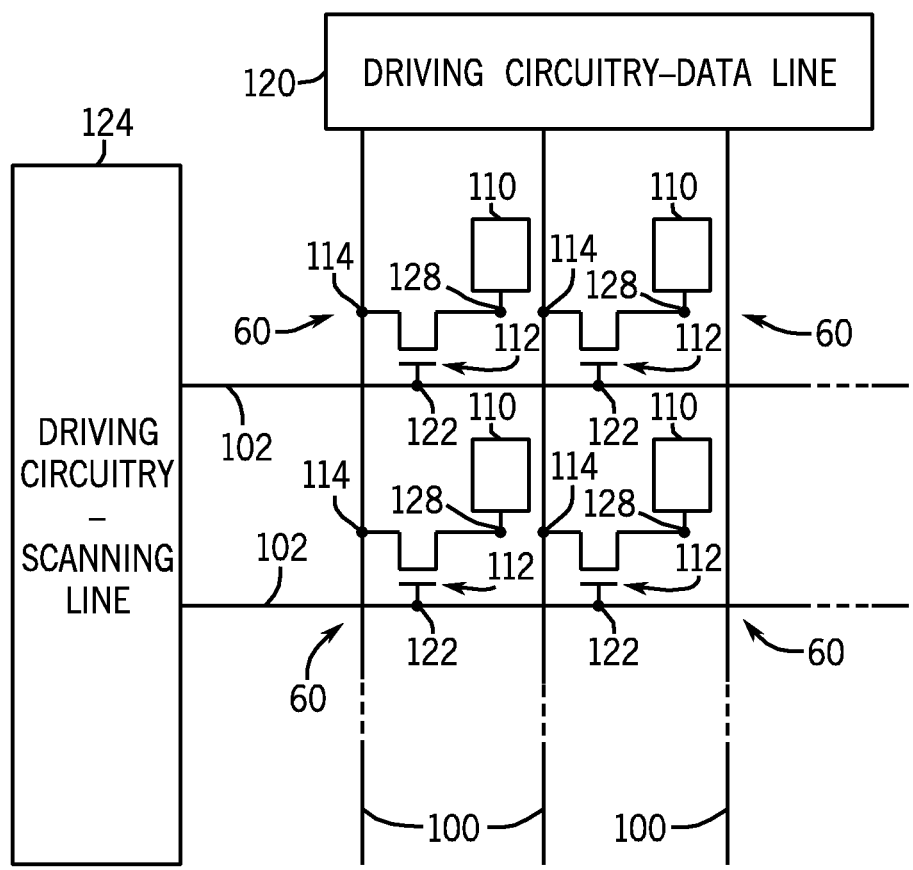
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided. For example, such circuitry as depicted in FIG. 5 may be embodied in the TFT layer 72 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Turning now to FIGS. 6-17, plan and cross-sectional views of pixels for use in a fringe field switched (FFS) LCD are provided. In FIG. 6, a plan view of a pixel 60 is provided depicting a transparent pixel electrode 110 and TFT 112 used as a switch for the pixel 60. A black mask 88 defines an aperture 150 through which light may be transmitted by the pixel 60. The black mask 88 may be formed from any suitable opaque material, such as opaque polymeric compositions (e.g., plastics), metals, and so forth. In the depicted example, the black mask 88 also functions to mask or cover a via hole 154 in which the TFT 112 is formed.

In the depicted example, the pixel electrode 110 is formed over a passivation layer 160 which insulates the pixel electrode 110 from an underlying common electrode. In one embodiment, the passivation layer 160 may be formed of silicon nitride. In the depicted embodiment, the pixel electrode 110 is formed so as to have two or more spaced apart extensions 162 or projections, e.g., fingers or slits, that span the aperture 150 in the y-direction. In the depicted embodiment of FIG. 6, the extensions 162 are the same width, w, and are spaced apart by the same distance, d.

Turning now to FIG. 7, one possible prior art partial cross-section of the pixel 60 of FIG. 6 is provided depicting the pixel electrode extensions 162, passivation layer 160, and the underlying common electrode 166. The common electrode may be continuous across the pixel or across multiple pixels and may be transparent to light. During operation, the common electrode 166 may function to provide a common voltage, $V_{com}$, across one or more pixels. In one embodiment, both the pixel electrode 110 and the common electrode 166 are formed from indium tin oxide (ITO). The extensions 162 of the pixel electrode 110 are depicted as being evenly spaced apart by distance d and of having the same width w. In addition, in accordance with the prior art, the extensions 162 are all formed at the same depth and have the same elevation, i.e., height, with respect to the depicted z-axis.

Turning now to FIG. 8, a partial cross-section of the pixel 60 of FIG. 6 is provided in accordance with one embodiment of the present technique. In accordance with this embodiment, the extensions 162 of the pixel electrode 110 are not all formed at the same depth. In particular, a sunken extension 170 is depicted which is partially recessed within the passivation layer 160 relative to the remainder of the pixel extensions. For example, in one embodiment, the surface of the passivation layer 160 may be selectively etched to form a trench in which the sunken extension 170 is later deposited. In another embodiment, the surface of the passivation layer 160 may be uneven as a result of previous coatings underneath and the sunken extension 170 may be formed in a recess or trough resulting from this unevenness.

Though the sunken extension 170 and other electrode extensions may be formed at different depths relative to the passivation layer 160 and the common electrode 166, in one embodiment the extensions may be substantially the same thickness, such as between about 500 Å to about 600 Å. For example, all of the extensions 162, including the sunken extension 170, may be formed by the same deposition process and may, therefore, be substantially the same thickness despite being formed at different depths relative to the passivation layer 160.

In the depicted embodiment, the partially recessed configuration of the sunken extension 170 provides a different effective electric field to the liquid crystal layer 78 (FIG. 4) than implementations where the pixel electrode extensions 162 are all at the same elevation, such as depicted in FIG. 7. In particular, in certain embodiments the configuration of pixel electrode extensions 162 of FIG. 8 may apply an electric field to the liquid crystal layer 78 which may result in a more optimized alignment of the liquid crystals, which can improve light transmittance. For example, to achieve consistent orientation of the liquid crystals in a pixel, a different field magnitude may be desired at the edges of a pixel compared to what is used at the center of the pixel to obtain the same liquid crystal orientation. Therefore, providing pixel extensions at different depths may provide an electric field at the pixel that allows liquid crystals to be oriented the same at the edges of the pixel as at the center of the pixel. In addition, varying the depth of certain extensions 162 may allow the use of a lower driving voltage at the circuit to achieve the desired light transmission characteristics.

Figure 9:
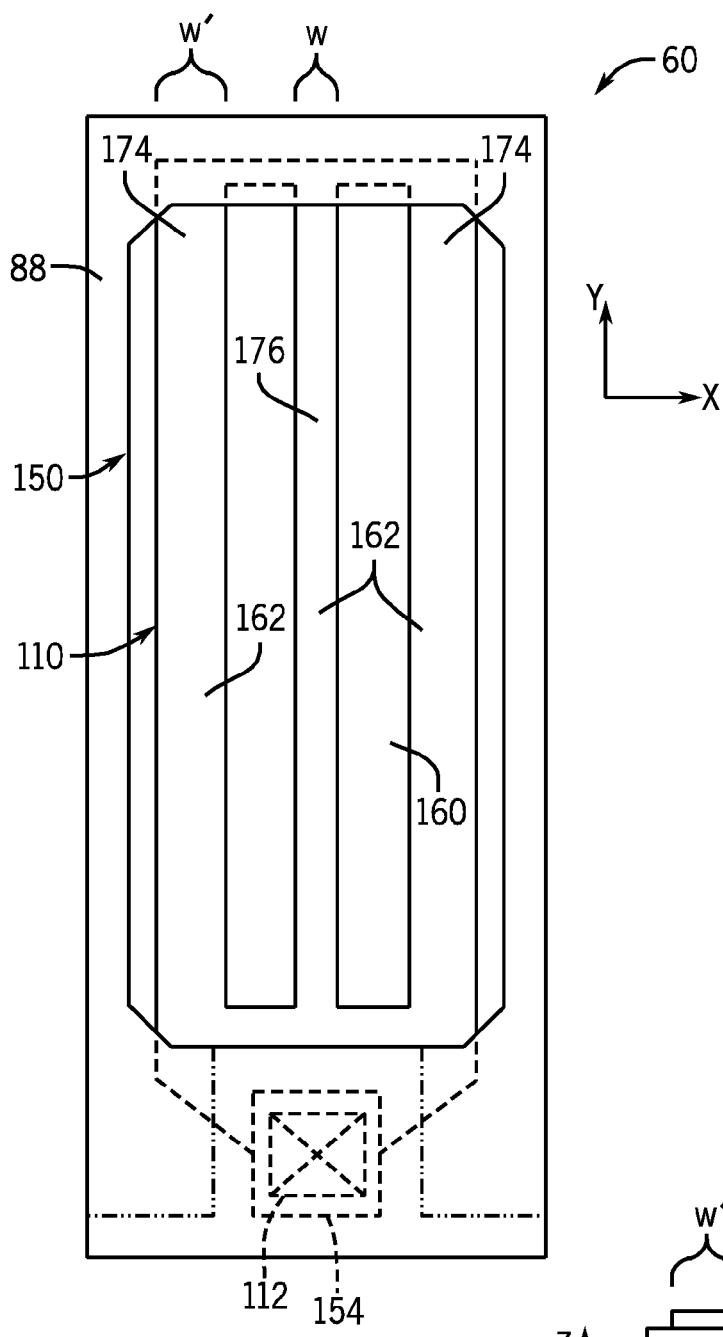
FIG. 9 is a plan view of a further embodiment of an LCD pixel in accordance with aspects of the present disclosure.

In another embodiment, referring now to FIG. 9, the extensions 162 of the pixel electrode 110 may have different widths, w and w'. For example, in the depicted embodiment, the outside extensions 174 may have a width w' while the inside extension 176 may have a width w. As with the use of extensions 162 at different depths, the use of pixel electrode extensions 162 of different widths may also provide a different effective electric field to the liquid crystal layer than implementations where the pixel electrode extensions 162 are the same width. For example, in certain embodiments the configuration of pixel electrode extensions 162 of FIG. 9 may apply an electric field to the liquid crystal layer 78 which would result in a more optimized alignment of the liquid crystals (which can improve light transmittance) and/or which may be generated using a lower driving voltage.

Figure 10:
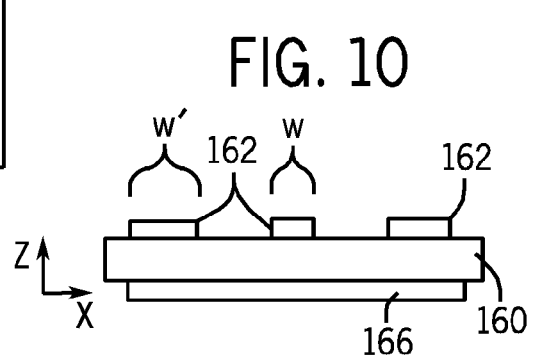
FIG. 10 is one possible partial cross section of the LCD pixel of FIG. 9, in accordance with aspects of the present disclosure.
Figure 11:
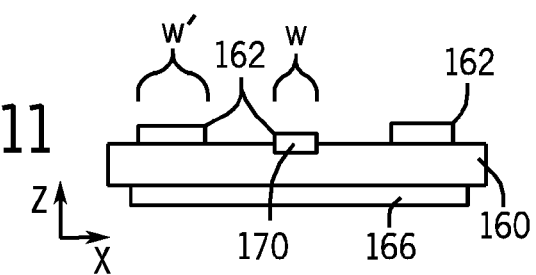
FIG. 11 is another possible partial cross section of the LCD pixel of FIG. 9, in accordance aspects of the present disclosure.

Turning to FIGS. 10 and 11, two possible partial cross-sections of the pixel 60 of FIG. 9 are depicted. In FIG. 10, a partial cross-section in which the pixel electrode extensions 162 are at the same depth and height is depicted. In such an embodiment, the adaptation of the shape and/or magnitude of the electric field may be generally achieved by varying the width of the pixel electrode extensions 162. In FIG. 11, a partial cross-section in which the pixel electrode extensions 162 are at different depths is depicted, i.e., one of the extensions 162 is a sunken extension 170. In such an embodiment, the adaptation of the shape and/or magnitude of the electric field may be generally achieved by varying the width and/or depth of the pixel electrode extensions 162.

Figure 12:
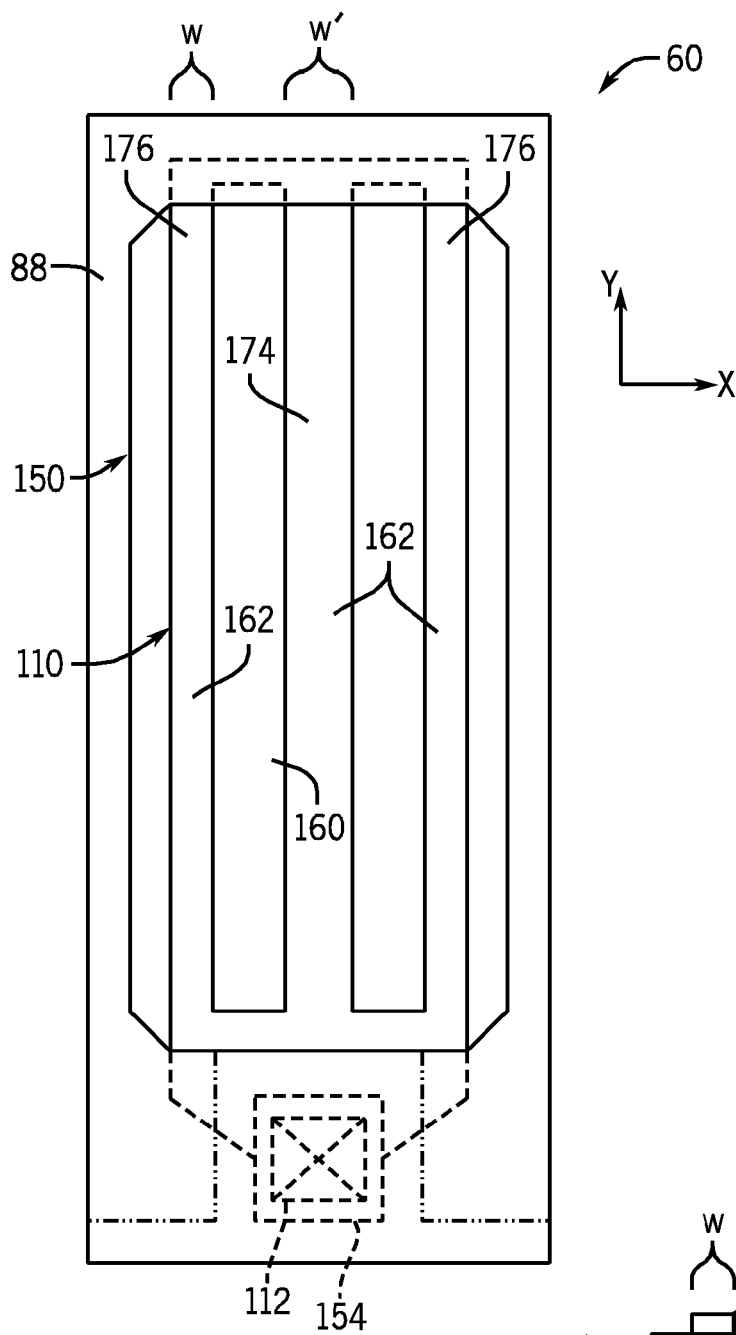
FIG. 12 is a plan view of another embodiment of an LCD pixel in accordance with aspects of the present disclosure.
Figure 13:
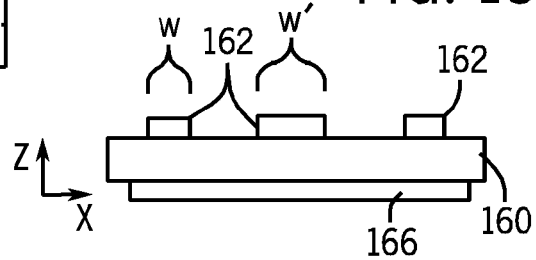
FIG. 13 is one possible partial cross section of the LCD pixel of FIG. 12, in accordance with aspects of the present disclosure.
Figure 14:
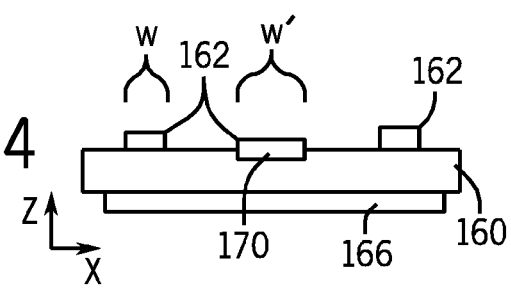
FIG. 14 is another possible partial cross section of the LCD pixel of FIG. 12, in accordance aspects of the present disclosure.

Referring now to FIG. 12, another embodiment is depicted in which the width of the pixel electrode extensions 162 is varied. In this depicted embodiment the outside extensions 174 may have a width w while the inside extension 176 may have a width w'. As with the embodiment of FIG. 9, having pixel electrode extensions 162 of different widths may provide a specified electric field to the liquid crystal layer that achieves an overall improved transmittance in the liquid crystal layer 78. In addition, FIGS. 13 and 14 depict two possible partial cross-sections of the pixel 60 of FIG. 12 and generally correspond to the embodiments disclosed in FIGS. 10 and 11. In particular, FIG. 13 depicts an embodiment in which the pixel electrode extensions 162 are at the same depth and height. Conversely, FIG. 14 depicts an embodiment in which the pixel electrode extensions 162 are at different depths.

Figure 15:
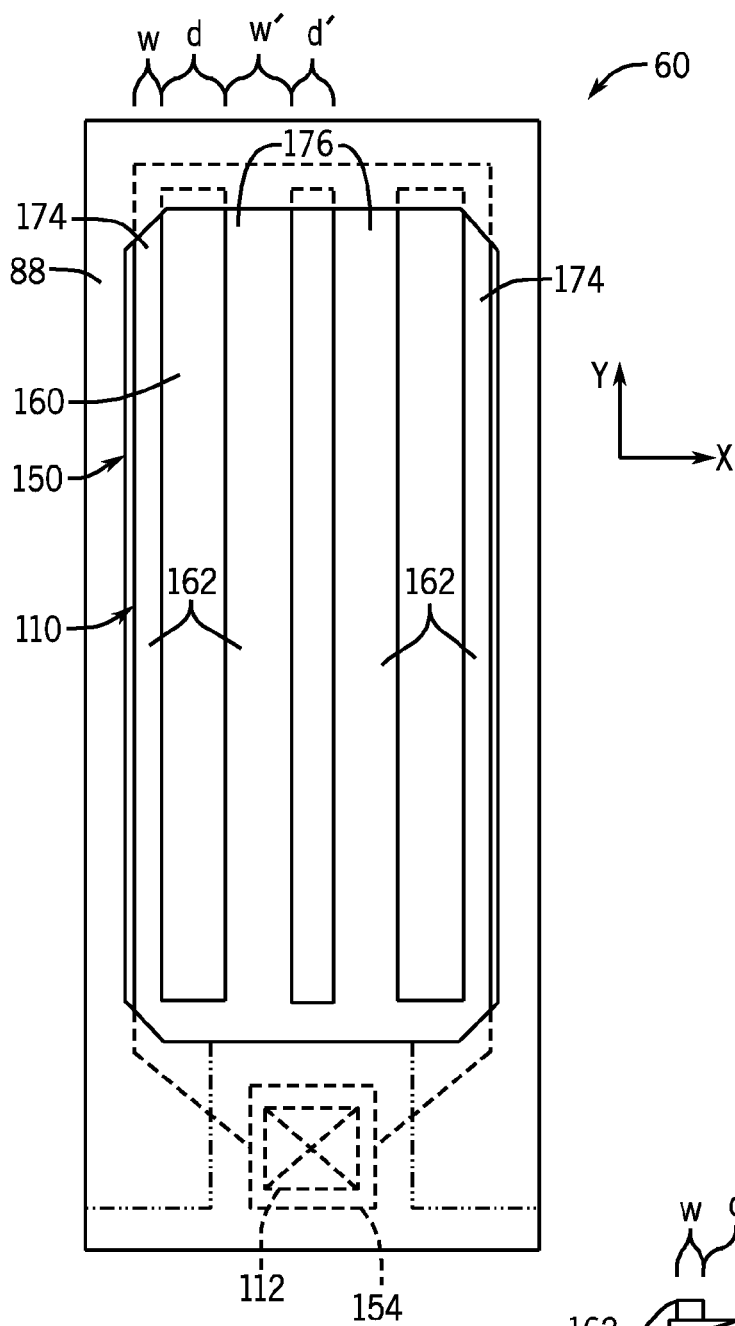
FIG. 15 is a plan view of an additional embodiment of an LCD pixel in accordance with aspects of the present disclosure.

In another embodiment, referring now to FIG. 15, not only do the extensions 162 of the pixel electrode 110 have different widths, w and w', the extensions 162 may also be differently spaced apart, i.e., the spacing between the extensions 162 is not uniform. For example, in the depicted embodiment, the outside extensions 174 may have a width w while the inside extensions 176 may have a width w'. Further, the spacing between the outside extensions 174 and the nearest inside extension 176 may be a distance d while the spacing between the two inside extensions 176 may be a distance d'. As with the use of extensions 162 at different depths and of different widths, differential or non-uniform spacing of the pixel electrode extensions 162 may also be used to shape and/or otherwise manipulate the electric field generated using the pixel electrode extensions 162 and/or may allow the use of a lower driving voltage to achieve the desired electric field.

Figure 16:
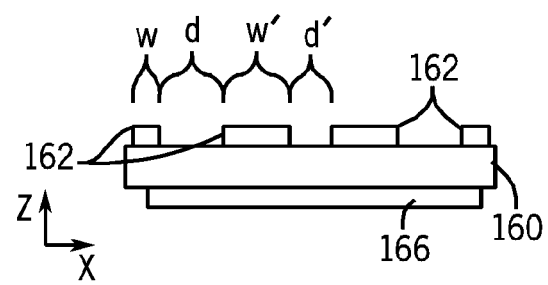
FIG. 16 is one possible partial cross section of the LCD pixel of FIG. 15, in accordance with aspects of the present disclosure.
Figure 17:
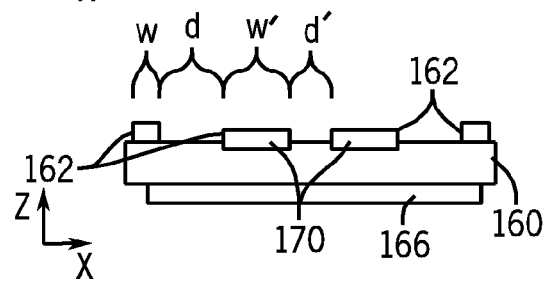
FIG. 17 is another possible partial cross section of the LCD pixel of FIG. 15, in accordance aspects of the present disclosure.

Turning to FIGS. 16 and 17, two possible partial cross-sections of the pixel 60 of FIG. 15 are depicted. In FIG. 16, a partial cross-section in which the pixel electrode extensions 162 are at the same depth and elevation is depicted. In such an embodiment, the adaptation of the shape and/or magnitude of the electric field may be generally achieved by varying the width and/or spacing of the pixel electrode extensions 162. In FIG. 17, a partial cross-section in which the pixel electrode extensions 162 are at different depths is depicted, i.e., two of the extensions 162 are sunken extensions 170. In such an embodiment, the adaptation of the shape and/or magnitude of the electric field may be generally achieved by varying the width, spacing, and/or depth of the pixel electrode extensions 162.

While the preceding examples describe configurations of pixels for use in a FFS LCD device, it should be understood that these examples are not intended to be limiting in scope and, indeed, the present teachings may also be applicable to other types of LCDs, such as in-plane switched (IPS) LCDs or others. Further, for simplicity the present examples describe circuitry in which the pixel electrode 110 is discontinuous (i.e., includes separated fingers or extensions 162) and the common electrode 166 is continuous. As will be appreciated, this arrangement may be reversed or otherwise varied. For example, in certain embodiments, the common electrode 166 may be discontinuous and the pixel electrode 110 may be continuous. In such embodiments, the extensions (strips, fingers, and so forth) of the common electrode may vary in width, depth, and/or interval spacing to achieve the benefits discussed herein. Likewise, in certain embodiments, the relative position of the pixel electrode 110 and the common electrode 166 may be reversed, i.e., the common electrode 166 may be proximate to the liquid crystal layer 78 while the pixel electrode 110 may be further away. In such embodiments, varying the spacing, width, and/or depth of the discontinuous electrode (whether pixel or common) may be performed as described herein to achieve the results described.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A liquid crystal display (LCD) comprising a plurality of pixels, each pixel comprising:
    an insulating layer;
    a first electrode formed along a y-axis of an x-y plane on a first side of the insulating layer, wherein the first side of the insulating layer comprises a first surface extending across the x-y plane at a first depth along a z-axis relative to the x-y plane and a second surface extending across the x-y plane at a second depth along the z-axis, wherein the first depth is above the second depth, the electrode comprising two or more finger-like regions, wherein at least one finger-like region of the two or more finger-like regions is disposed on top of the second surface of the first side of the insulating layer, and wherein a first portion of the at least one finger-like region is disposed below the first depth and wherein a second portion of the at least one finger-like region is disposed above the first depth;
a second electrode formed on a second side of the insulating layer opposite the first side;
a liquid crystal layer, wherein alignment of a plurality of liquid crystals within the liquid crystal layer is determined by operation of the first and the second electrode.

2. The LCD panel of claim 1, wherein the two or more regions are of different widths relative to one another.

3. The LCD panel of claim 1, wherein the first electrode and the second electrode are substantially transparent.

4. The LCD panel of claim 1, wherein the first electrode comprises a pixel electrode and the second electrode comprises a common electrode.

5. An electronic device, comprising:
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD comprises a plurality of pixels, each pixel comprising:
a liquid crystal layer comprising a plurality of liquid crystals whose alignment is determined by an electric field, wherein the alignment of the liquid crystals determines the amount of light which passes through the liquid crystal layer at the respective pixel; and
an electrode formed along a y-axis of an x-y plane of an insulating layer, wherein the insulating layer comprises a surface having a first depth along a z-axis with respect to the x-y plane and a second depth at a lower depth along the z-axis than the first depth, wherein the surface comprises at least one recessed region disposed at the second depth, and wherein the electrode is part of a circuit used to generate the electric field, the electrode comprising two or more slat-like portions such that at least one slat-like portion is disposed in the at least one recessed region, wherein a first portion of the at least one slat-like portion is below the first depth and wherein a second portion of the at least one slat-like portion is above the first depth.

6. The electronic device of claim 5, wherein the LCD panel comprises a fringe field switched (FFS) LCD panel.

7. The electronic device of claim 5, wherein at least two of the two or more slat-like portions have different widths.

8. A liquid crystal display (LCD) panel, comprising:
a liquid crystal layer comprising a plurality of liquid crystals whose alignment is determined by one or more electric fields; and
a circuitry layer capable of generating the one or more electric fields, the circuitry layer comprising:
an insulating layer;
a first electrode disposed on a first side of the insulating layer; and
a second electrode disposed along a y-axis of an x-y plane parallel to a second side of the insulating layer opposite the first side, wherein the second side of the insulating layer comprises a first surface extending across the x-y plane at a first depth relative to a z-axis of the x-y plane and a second surface extending across the x-y plane at a second depth different from the first depth relative to the z-axis, wherein the second electrode comprises a first region disposed on the first surface at the first depth and a second region disposed on the second surface at the second depth, wherein the second depth is depressed into the second side of the insulating layer and wherein the first and second regions are of different widths, wherein a first portion of the second region is below the first depth and wherein a second portion of the second region is disposed above the first depth.

9. The LCD of claim 8, wherein each pixel comprises a backlight assembly capable of generating light which is modulated based on the alignment of the plurality of liquid crystals at the pixel.

10. The LCD of claim 8, wherein the second electrode is connected to a drain of a thin film transistor (TFT) which controls generation of an electric field between the second electrode and the first electrode.

11. The LCD of claim 8, comprising a backlight assembly capable of emitting light that is modulated by the liquid crystal layer based on the alignment of the plurality of liquid crystals.

12. A liquid crystal display (LCD) comprising a plurality of pixels, each pixel comprising:
an insulating layer;
a first electrode formed on a first side of the insulating layer;
a second electrode formed on a second side along a y-axis of an x-y plane parallel to a primary surface of the insulating layer opposite the first side, the second electrode comprising three or more extensions, wherein at least two of the extensions are penetrate into the primary surface of the insulating layer relative to a z-axis with respect to the x-y plane, and wherein the interval spacing between the three or more extensions is not uniform, wherein a first portion of each lateral side of each of the at least two of the extensions are abutting the insulating layer, wherein a second portion of each lateral side of each of the at least two of the extensions are not abutting the insulating layer, and wherein each lateral side of each of the at least two of the extensions comprises a surface that is orthogonal to the x-y plane; and
a plurality of liquid crystals whose alignment is determined by an electric field generated between the first electrode and the second electrode.

13. The LCD of claim 12, wherein the at least two of the three or more extensions have different widths.

14. The LCD of claim 12, comprising a backlight assembly capable of emitting light that is modulated based on the alignment of the plurality of liquid crystals.

15. The LCD of claim 12, comprising a thin film transistor electrically connected to the first electrode and the second electrode to control generation of the electric field.

16. A liquid crystal display (LCD) comprising a plurality of pixels, each pixel comprising:
a first electrode disposed on a first side of an insulating layer; and
a second electrode disposed on a second side of the insulating layer opposite the first side, wherein the second electrode comprises two or more discontinuous regions formed along a y-axis of an x-y plane of the insulating layer, wherein at least one of the two or more discontinuous regions have a different elevation with respect to a z-axis relative to the x-y plane of the insulating layer, and wherein the at least one of the two or more discontinuous regions is sunken into the insulating layer such that each lateral side of the at least one of the two or more discontinuous regions comprises a first portion that touches the insulating layer and a second portion that does not touch the insulating layer, wherein a surface of each lateral side of the at least one of the two or more discontinuous regions is perpendicular to the x-y plane; and
a liquid crystal layer comprising a plurality of liquid crystals whose alignment is determined by an electric field generated by the first electrode and the second electrode.

17. The LCD of claim 16, wherein at least two of the two or more discontinuous regions have different widths relative to one another.

18. An electronic device, comprising
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD comprises a plurality of pixels, each pixel comprising:
 a plurality of liquid crystals whose alignment is determined by an electric field;
 a first electrode formed on a first side of an insulator layer;
 a second electrode formed along a y-axis of an x-y plane parallel to a second side of the insulator layer opposite the first side, wherein the second side of the insulator layer comprises a surface region having a first depth along a z-axis relative to the x-y plane and at least one depressed region having a second depth different from the first depth along the z-axis, wherein the second electrode comprises two or more finger-like extensions such that at least one of the two or more finger-like extensions is disposed in the at least one depressed region of the insulating layer, wherein a first portion of each lateral side of each of the at least one of the two or more finger-like extensions is abutting the insulator layer, and wherein a second portion of each lateral side of each of the at least one of the two or more finger-like extensions is above the first depth;
 a thin film transistor (TFT) electrically connected to the first electrode and the second electrode such that operation of the TFT controls generation of the electric field; and
 a backlight assembly capable of generating light that is modulated by the plurality of liquid crystals.

19. The electronic device of claim 18, wherein at least two of the two or more finger-like extensions have different widths relative to one another.

20. The electronic device of claim 18, wherein the two or more finger-like extensions comprise more than three finger-like extensions and wherein the more than three finger-like extensions are not uniformly spaced apart.

21. A method of manufacturing a liquid crystal display (LCD) comprising a plurality of pixels, comprising:
forming a first electrode;
forming an insulative layer on the first electrode;
forming a second electrode along a y-axis of an x-y plane parallel to a primary surface of the insulative layer such that two or more extensions of the second electrode are formed at different depths along a z-axis with respect to the x-y plane of the insulative layer, wherein at least one of the two or more extensions are formed sunken into the primary surface of the insulative layer along the z-axis, and wherein the at least one of the two or more extensions are not entirely enclosed by the insulative layer;
providing a liquid crystal layer at each pixel such that an electric field generated between the first electrode and the second electrode affects the alignment of a plurality of liquid crystals at the respective pixel.

22. The method of claim 21, wherein forming the second electrode comprises forming the second electrode such that at least two of the two or more extensions have different widths relative to one another.

23. The method of claim 21, comprising installing the LCD as a display of an electronic device.

\* \* \* \* \*